G. G. F. BOSWELL.
CHAIN SAW.
APPLICATION FILED SEPT. 14, 1914. RENEWED DEC. 20, 1918.
1,349,557.
Patented Aug. 17, 1920.
2 SHEETS—SHEET 1.
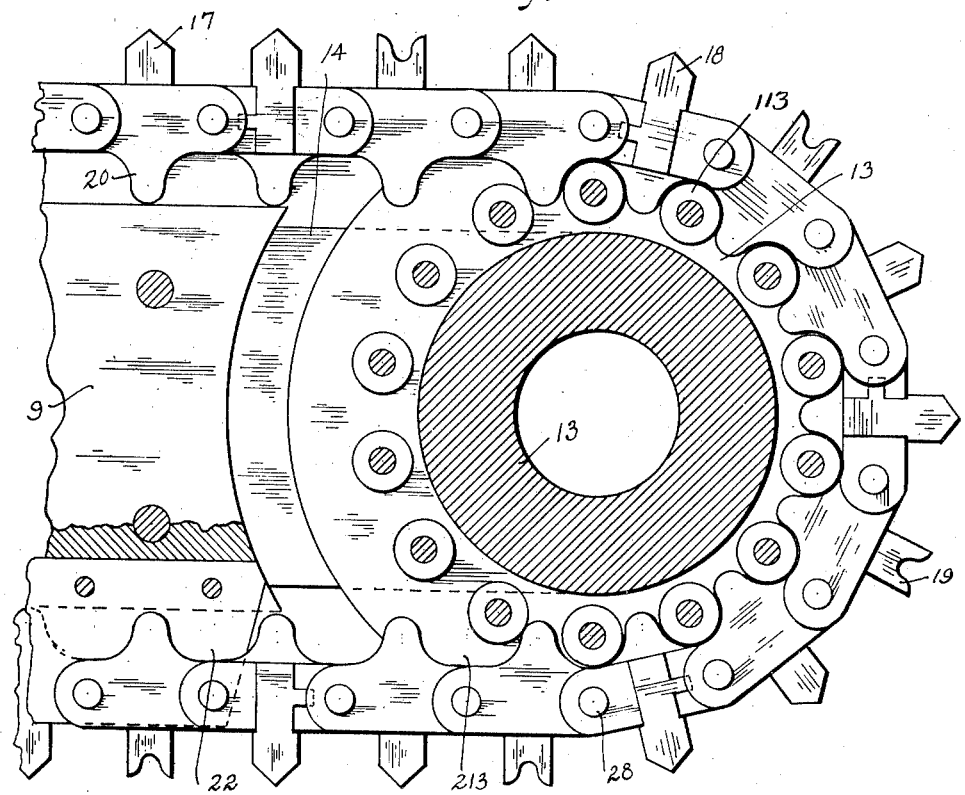
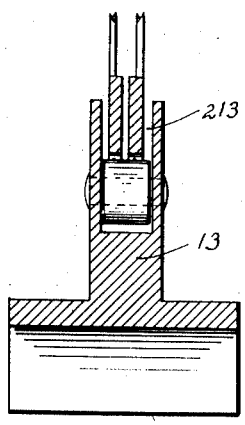
WITNESSES:
INVENTOR.
George G. F. Boswell.
BY
ATTORNEY.

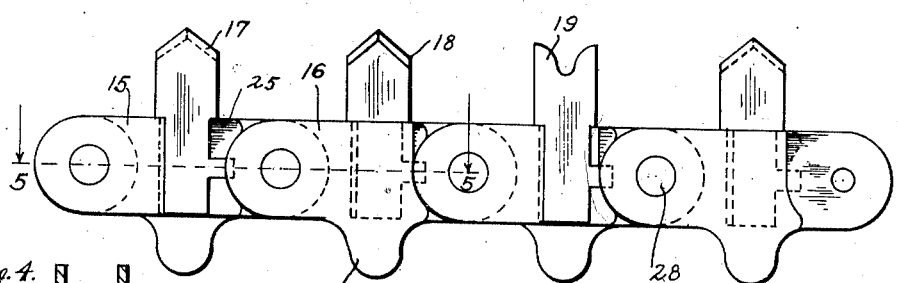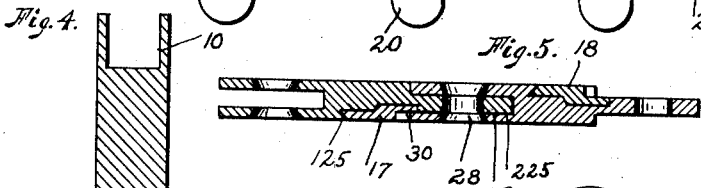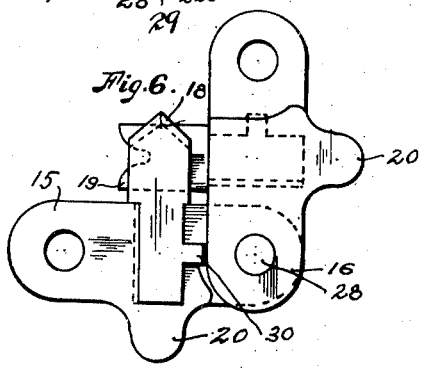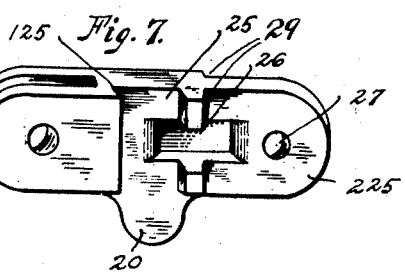

UNITED STATES PATENT OFFICE.

GEORGE G. F. BOSWELL, OF INDIANAPOLIS, INDIANA, ASSIGNOR OF ONE-EIGHTH TO VIRGIL H. LOCKWOOD AND ONE-EIGHTH TO RALPH G. LOCKWOOD, BOTH OF INDIANAPOLIS, INDIANA.

CHAIN SAW.

1,349,557.     Specification of Letters Patent.     Patented Aug. 17, 1920.

Application filed September 14, 1914, Serial No. 861,604. Renewed December 20, 1918. Serial No. 267,714.

*To all whom it may concern:*

Be it known that I, GEORGE G. F. BOSWELL, a citizen of the United States, and a resident of Indianapolis, county of Marion, and State of Indiana, have invented a certain new and useful Chain Saw; and I do hereby declare that the following is a full, clear, and exact description thereof, reference being had to the accompanying drawings, in which like letters refer to like parts.

The object of this invention is to improve the construction of endless chain saws and render such saws practical under all reasonable conditions of use and particularly to prevent the friction and pull arising from the return movement of the saw teeth through the kerf and to prevent the gumming of the saw from interfering with its operation. This endless chain is of the type wherein the chain moves in one direction about the edge of a single frame or sheet of steel which is substantially the same shape as a cross cut saw and, therefore, the entire saw enters the kerf and passes through the wood being sawed.

The chief feature of the saw consists in two independent and parallel chains operating on the same frame or blade and each carrying its own teeth so that the teeth on one chain will saw at one side of the kerf and the teeth on the other chain will saw at the other side of the kerf, and the frame or blade is provided with guideways so as to bring the teeth together on the return movement through the kerf.

The full nature of the invention will be understood from the accompanying drawings and the following description and claims:

In the drawings, Figure 1 is a side elevation of the lower part of one end of a saw with parts broken away leaving a section. Fig. 2 is a horizontal section on the line 2—2 of Fig. 1. Fig. 3 is a side elevation of a section of one of the chains with its teeth. Fig. 4 is a vertical transverse section through the saw. Fig. 5 is a section on the line 5—5 of Fig. 3. Fig. 6 is a side elevation of two links of the chain, turned at a right angle to each other. Fig. 7 is a perspective view of one of the links with the teeth removed.

In the first place a frame or blade 9 of substantially the same shape as a cross cut saw is formed with a wide groove 10 extending longitudinally along the upper edge of the frame and a pair of longitudinal grooves 12 parallel with each other in the lower edge of the frame. At each end of the frame there is a sprocket wheel 13 mounted on bearing plates 14 secured to each side of the frame 9.

Two endless chains, each formed of links 15 and 16, are provided and both travel in the same direction through said grooves around the edges of said frame 9 and over a sprocket wheel at each end of said frame, one of said sprocket wheels being provided with power from any suitable source, not shown. Each link 15 and 16 has an inwardly extending shank 20 to engage the roller teeth 113 of the sprocket wheel and also moves through said grooves 10 and 12. While traveling through the groove 10 on the upper side of said frame 9, the corresponding links of the two chains move side by side in one groove, but on the underside of said frame, they separate and travel through grooves 12 which are separated by a longitudinal partition 21 which spreads the links of the two chains apart. A separating plate 22 is also inserted in the lower edge of the frame 9 and projects below the same to separate the paths of the links of the two chains and hold them outwardly laterally to their work and resist the inward strain on said links.

The links have suitable teeth, as may be desired, there being here shown cutting teeth 17 on one side of one link and a cutting tooth 18 on the opposite side of the adjacent link and a drag tooth 19 in the third link. The cutting teeth are beveled on their inner cutting edges, as usual. The invention is in no wise limited to the number of teeth attached to the chain or to any link thereof, nor to the manner of inserting or attaching said teeth. In the form herein shown each link has a vertical socket 25 on its side substantially in vertical alinement with the shank 20, and one edge, 125, is dove-tailed. There is a horizontal recess 26 about midway of the tooth of the link between the top and bottom thereof which extends for about one-half the width of the socket 25 and almost to a rivet hole 27 through which a rivet 28 extends for securing one link to an adjacent link. One end of each link, as shown in Fig. 5, has a lateral recess 29 on each side to leave a central end 225 and the other end of each link is bifurcated, as shown in Fig. 7. The shank of each tooth is formed so as to fit into the socket 25 and to have an arm 30 extending therefrom and lying in the recess 26 in position so that it will be overlapped by one of the bifurcated ends of an adjacent link, when two links are pivoted together, as shown in Fig. 5. The ends of the links are formed, as shown in Fig. 6, so that when they are turned to a right angle the bifurcated end of one link will not overlap the arm 30 of the tooth in the adjacent link. Therefore, when the links are at a right angle to each other, a tooth may be inserted or removed, but when the teeth are in alinement with each other, the tooth in each link is held in its socket and from escape by the adjacent link.

It is seen from the foregoing that the tooth is readily insertible or removable and is securely held in place from vertical movement on account of the arm 30 and recess 26 and from movement otherwise when under strain because of the walls of the socket 25.

Each sprocket wheel has a peripheral groove 213 in which the chains lie and said groove is slightly wider than the groove 10 in the upper edge of the saw frame and substantially the same as the combined width of the two grooves 12 and the intermediate partition at the underside of the saw frame. This is to permit the chains to separate as they pass from the sprocket wheel to said lower grooves or from said lower grooves to the sprocket wheel.

The invention claimed is:

1. A chain saw machine having a plurality of similar tooth carrying endless chains, and means over which said endless chains travel together in the same direction and arranged to cause the chains to be spread apart during the cutting movement and be brought together during the return movement through the kerf.

2. A chain saw machine having a plurality of similar tooth carrying endless chains and a frame with a longitudinal groove along the upper edge through which the corresponding links of the two chains pass adjacent to each other, and a separate groove for the links of each chain on the underside of said frame.

3. A chain saw including a plurality of teeth carrying endless chains with inwardly extending shanks, and a frame with a single longitudinal groove along the upper edge thereof through which the shanks of corresponding links in the two chains move adjacent to each other, and a pair of separate grooves in the underside of said frame through which the shanks of the links of the chains move separately, whereby the chains will be spread laterally from each other during the sawing movement thereof.

4. A chain saw machine including a plurality of teeth carrying endless chains with inwardly extending shanks and a frame with a single longitudinal groove along the upper edge thereof through which the shanks of corresponding links in the two chains move adjacent to each other, a pair of grooves in the underside of said frame through which the shanks of the links of the chains move separately, and a partition plate extending centrally and longitudinally from the underside of said frame to hold the links of the chains separated and to their work while they are doing the sawing movement of the links.

5. A chain saw machine including a plurality of similar tooth carrying endless chains, a frame with a longitudinal groove along the upper edge through which the links of the two chains pass adjacent to each other and a pair of longitudinal grooves in the lower edge of said frame for the links of each chain, said lower grooves being separated by a partition, and sprocket wheels at the end of said frame, each provided with a peripheral groove in which both of said chains lie.

6. A chain saw machine including a plurality of similar tooth carrying endless chains, a frame with a longitudinal groove along the upper edge through which the links of the two chains pass adjacent to each other and a pair of longitudinal grooves in the lower edge of said frame for the links of each chain, said lower grooves being separated by a partition, and sprocket wheels at the end of said frame, each provided with a peripheral groove in which both of said chains lie, and the grooves in said sprocket wheels being wider than the top groove of the frame and substantially the same as the width of the two lower grooves and their intervening partition.

7. A chain saw machine including a plurality of tooth carrying chains, and means for moving said chains lengthwise and arranged to cause them to be spread apart during the cutting movement and brought together during the return movement through the kerf.

8. A chain saw machine including tooth-carrying chains, and means for supporting and guiding said chains and having separated grooves arranged to spread said chains during the cutting movement and a groove for bringing said chains together during the return movement thereof.

In witness whereof, I have hereunto affixed my signature in the presence of the witnesses herein named.

GEORGE G. F. BOSWELL.

Witnesses:
J. H. WELLS,
R. G. LOCKWOOD.